United States Patent [19]
Strindehag

[11] 3,818,226
[45] June 18, 1974

[54] IDENTITY DOCUMENT AND A METHOD AND AN APPARATUS FOR CHECKING SUCH A DOCUMENT

[75] Inventor: Ove Magnus Strindehag, Nukoping, Sweden

[73] Assignee: AB ID-Kort, Stockholm, Sweden

[22] Filed: June 7, 1971

[21] Appl. No.: 150,517

[30] Foreign Application Priority Data
June 11, 1970  Sweden............................... 8149/70

[52] U.S. Cl................. 250/302, 250/501, 250/390, 340/149 A
[51] Int. Cl. ............................................. G21h 5/00
[58] Field of Search........ 350/83.1; 250/106 T, 302, 250/501, 390; 340/149 A

[56] References Cited
UNITED STATES PATENTS

| | | | |
|---|---|---|---|
| 2,308,176 | 1/1943 | Howell | 250/106 T |
| 2,390,433 | 12/1945 | Fearon | 250/83.6 |
| 2,879,402 | 3/1959 | Ferre | 250/83.1 |
| 2,991,367 | 7/1961 | Thayer | 250/84.5 |
| 3,025,399 | 3/1962 | Verbinski | 250/106 T |
| 3,146,349 | 8/1964 | Jordan | 250/106 T |
| 3,233,103 | 2/1966 | Aoki | 250/83.1 |
| 3,509,535 | 4/1970 | Berube | 340/149 A |
| 3,564,215 | 2/1971 | Peeples | 340/149 A |
| 3,574,550 | 4/1971 | Scott | 250/106 T |
| 3,596,249 | 7/1971 | Tierney | 340/149 A |

Primary Examiner—Harold A. Dixon
Attorney, Agent, or Firm—Pierce, Scheffler and Parker

[57] ABSTRACT

An identity document contains a small quantity of a non-radioactive trace element. The trace element may be an element which absorbs thermal neutrons. In this case the identity document is checked by sending a flow of thermal neutrons through the document and measuring the absorption of the neutrons. Alternatively, the trace element may be an element which, upon being exposed to neutron radioation, creates a secondary radiation. In this case the identity document is checked by exposing the document to thermal neutrons and measuring the secondary radiation.

2 Claims, 1 Drawing Figure

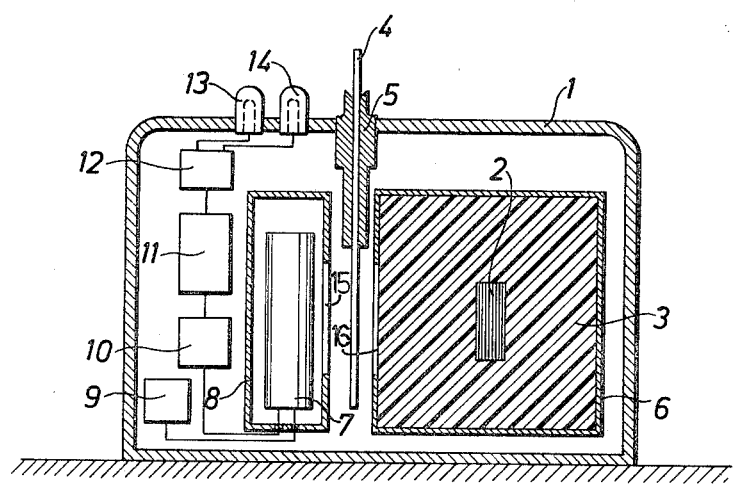

IDENTITY DOCUMENT AND A METHOD AND AN APPARATUS FOR CHECKING SUCH A DOCUMENT

The present invention relates to an identity document and a method and an apparatus for checking such a document. The invention is particularly concerned with an identity document in the form of an identification card.

Identity documents are usually made of a special type of paper and are provided with certain check or control means, for example in the form of complicated printed patterns, water-marks or fluorescent letters. Coating the identity document with radioactive elements is also known. It is an advantage if one or more of said check means can be identified automatically with the aid of a checking apparatus. The identity document may then also be used to make withdrawals from a bank account via an automatic machine. In order to make forgery more difficult it is an advantage if one of the check means can only be identified with difficulty without access to said checking apparatus.

The present invention relates to an identity document containing a small quantity of a non-radioactive trace element included in the paper or film material from which the document is made. The term trace element is used in this specification because the presence of the trace element makes it possible to trace or identify the document. The trace element shall belong to the group of elements which, upon being exposed to neutron radiation, absorb at least part of said radiation or produce a secondary radiation, such as beta, gamma, or neutron radiation. The trace element should be difficult to detect by normal chemical methods, and should also be difficult to obtain. Furthermore, the isotope composition of the trace element should preferably be different from the natural isotope composition of the element. By providing identity documents with a certain accurately measured quantity of such a trace element, the chances of forgery are extremely limited. Of course, mixtures of several different trace elements may also be used. Examples of useful trace elements will be given below. As a general rule we prefer to use trace elements having an atomic number lower than 70. If the identity document is provided with coded information, for example in the form of transparent spots or areas, the trace element can be placed in such a way that any alteration of the coded information is made more difficult.

In order rapidly to be able to check that an identity document contains the correct trace element, a checking apparatus of a special type is required. The type of instrument which can be used for an identity document in accordance with the invention is based on the fact that the trace element has certain characteristic properties when being exposed to radioactive radiation. Such an apparatus can be constructed to check quickly whether an identity document contains the correct trace element, and in certain cases, that the isotope composition of the element is correct.

The invention is also concerned with an apparatus for checking an identity document of the type referred to. Said apparatus comprises means for producing neutron radiation, radiation detecting and measuring means, and means for inserting an identity document into a predetermined position between the neutron radiation producing means and the radiation detecting means.

According to a preferred embodiment a neutron absorbing material shall be arranged to surround the neutron producing means, so as to produce a flow of thermal neutrons, that is neutrons having a low velocity. The use of thermal neutrons is preferred, first, because it is comparatively easy to find trace elements having a high absorption of thermal neutrons and, second, because an apparatus operating with thermal neutrons does not involve any hazard of the health of the operator.

In the embodiment of the invention which comprises measuring the absorption of the neutron radiation, a trace element having several stable isotopes should be selected. One of these isotopes shall give high absorption of the neutron radiation, whereas the others only negligibly absorb this radiation. The absorption measurement will then show if the trace element has the correct isotope composition. An example of a suitable trace element is cadmium having a high content of $Cd^{113}$. Cadmium having the natural isotope composition contains 12.3 % $Cd^{113}$. The isotope $Cd^{113}$ gives an extremely high absorption of neutrons, whereas the other cadmium isotopes give a low absorption. Other useful elements are boron, especially $B^{10}$, and lithium. When measuring the absorption of the neutron radiation the neutron-sensitive detector is preferably a $BF_3$ counter.

If the identity document is provided with coded information in the form of transparent areas, the trace element should be distributed over the entire surface of the document. Any attempt to alter the code by making new holes in the document, thus causes a decrease in the absorption of radioactive radiation of the card. However, a sufficient quantity of trace element must be applied so that the absorption is substantially complete for undamaged documents.

For adding the trace element to the identity document it is preferred to prepare a solution of the element, to wet the document with this solution, and to dry the document. If the document is a photographic paper, the trace element may be incorporated in the paper layer or in the photographic layer.

In the embodiment of the invention which comprises measuring the secondary radiation, the trace element should preferably also consist of several stable isotopes, at least one of which produces a strong secondary radiation when being irradiated by neutrons. The secondary radiation may consist of beta or gamma radiation. In these cases the radiation detector is preferably a GM-tube, a scintillation detector of a semiconductor detector. Alternatively, the secondary radiation may be a neutron radiation. In this case the radiation detector is preferably a $BF_3$ counter. If, as well as being sensitive to the secondary radiation, the detector is also sensitive to the primary neutron radiation, a radiation screen which reduces the primary neutron radiation should be placed immediately in front of the detector. Silver having a high percentage of $Ag^{109}$, may for example, be used as trace element. The natural composition of silver is 48.7 % $Ag^{109}$ and 51.3 % $Ag^{107}$. When $Ag^{109}$ is radiated with neutrons, it emits beta radiation having a high energy (2.9 MeV). Beta radiation also results when $Ag^{107}$ is radiated with neutrons, but this radiation has lower energy and intensity. Other useful elements are manganese and rhodium.

The invention will new be described with reference to the drawing, which illustrates an apparatus for checking identification cards by measuring the absorption. The apparatus comprises a casing 1 in which a neutron radiation source 2 is placed, for example a Pu-Be source with a strength of 0.01 Ci. The source is surrounded by a moderator 3, for example of polyethylene, in which the speed of the neutrons is reduced. The moderator is surrounded by a neutron absorbing shield 6, for example of cadmium. The shield 6 has an opening 16, which may have a size of approximately 10 cm². A flow of low velocity neutrons, so-called thermal neutrons, leaves the opening 16. The casing also contains a neutron detector 7 consisting of a $BF_3$ tube. The detector is surrounded by a shield 8 of neutron absorbing material. The shield 8 has an opening 15 registering with the opening 16 of the casing 6 of the neutron flow producing member.

The identity card 4 to be checked is inserted into the apparatus through a holder 5 which holds the card in a predetermined position, in which a portion of the card is situated between the radiation source and the radiation detector. The trace element may be present only in said portion of the card, or in the whole card.

The $BF_3$ tube 7 is connected to a high voltage unit 9 and to an amplifier 10. The frequency of the in-coming pulses is converted in a pulse frequency gauge 11 to a direct voltage which operates an alarm 12. If the pulse frequency is correct, i.e., there is the correct quantity of trace element on the identity card, the alarm activates a green signal light 13 so that it lights up. If the pulse frequency deviates from the correct value, a red warning lamp 14 is lit. If the identity card is being automatically checked the alarm may instead emit a signal to a computer.

What is claimed is:

1. A document subject to identification by production of secondary radiation and which incorporates isotopes of a trace element which after neutron irradiation emits beta or gamma radiation, said isotopes having a beta or gamma radiation of higher intensity than has the natural isotope composition thereof, and which is selected from the group consisting of silver and rhodium.

2. A document subject to identification by absorption of neutron radiation to which it is exposed and which incorporates isotopes of a neutron absorbing trace element, said trace element having an isotopic composition different from the natural element and having higher neutron absorbability than has the natural isotopic composition thereof, and which is selected from the group consisting of cadmium and lithium.

* * * * *